(12) United States Patent
Wu et al.

(10) Patent No.: US 10,299,449 B2
(45) Date of Patent: May 28, 2019

(54) VEGETABLE CARRYING BOX

(71) Applicants: HAIER GROUP CORPORATION, Qingdao, Shandong (CN); QINGDAO HAIGAO DESIGN & MANUFACTURING CO., LTD, Qingdao, Shandong (CN)

(72) Inventors: Jian Wu, Shandong (CN); Shu Zhou, Shandong (CN); Zhaojun Fei, Shandong (CN); Haibo Liu, Shandong (CN)

(73) Assignees: HAIER GROUP CORPORATION, Qingdao, Shandong (CN); QINGDAO HAIGAO DESIGN & MANUFACTURING CO., LTD., Qingdao, Shandong (CN)

( * ) Notice: Subject to any disclaimer, the term of this patent is extended or adjusted under 35 U.S.C. 154(b) by 407 days.

(21) Appl. No.: 14/894,855

(22) PCT Filed: Mar. 31, 2014

(86) PCT No.: PCT/CN2014/074366
§ 371 (c)(1),
(2) Date: Nov. 30, 2015

(87) PCT Pub. No.: WO2014/190797
PCT Pub. Date: Dec. 4, 2014

(65) Prior Publication Data
US 2016/0100536 A1    Apr. 14, 2016

(30) Foreign Application Priority Data

May 30, 2013  (CN) .......................... 2013 1 0209291
May 30, 2013  (CN) .......................... 2013 1 0209594

(Continued)

(51) Int. Cl.
*A01G 31/02*    (2006.01)
*A01G 31/06*    (2006.01)
(Continued)

(52) U.S. Cl.
CPC ............. *A01G 31/02* (2013.01); *A01G 7/045* (2013.01); *A01G 31/06* (2013.01); *B65D 25/04* (2013.01); *Y02P 60/216* (2015.11)

(58) Field of Classification Search
CPC .. A01G 31/00; A01G 2031/006; A01G 31/02; A01G 31/06
USPC ...................... 47/59 R, 62 C, 62 N, 62 R, 63
See application file for complete search history.

(56) References Cited

U.S. PATENT DOCUMENTS 3,959,923 A * 6/1976 Selke ........................ C02F 3/32
                                                      435/292.1
5,121,708 A * 6/1992 Nuttle .................... A01G 31/02
                                                      119/200

(Continued)

FOREIGN PATENT DOCUMENTS

CN       202211047 U      5/2012
CN       102648695 A      8/2012
(Continued)

OTHER PUBLICATIONS

State Intellectual Property Office of the P.R. China (ISR/CN), "International Search Report for PCT/CN2014/074366", China, Jun. 25, 2014.

*Primary Examiner* — David J Parsley
(74) *Attorney, Agent, or Firm* — Tim Tingkang Xia, Esq.; Locke Lord LLP

(57) ABSTRACT

A vegetable carrying box includes a solution carrying box provided with a high-level liquid inlet and a low-level liquid outlet that are opposite to each other, where an area between the liquid inlet and the liquid outlet in the solution carrying (Continued)

box is provided with protruding diversion partitions to form a zigzag flow passage, and an atomizer is disposed in the flow passage.

15 Claims, 5 Drawing Sheets

(30) Foreign Application Priority Data

May 30, 2013 (CN) .......................... 2013 1 0209841
May 30, 2013 (CN) .......................... 2013 1 0209842

(51) Int. Cl.
*A01G 7/04* (2006.01)
*B65D 25/04* (2006.01)

(56) References Cited

U.S. PATENT DOCUMENTS

| 5,136,804 | A | * | 8/1992 | Rothem | A01G 31/02 |
| | | | | | 47/59 R |
| 5,323,567 | A | * | 6/1994 | Nakayama | A01G 7/045 |
| | | | | | 47/63 |
| 5,557,884 | A | * | 9/1996 | Deppe | A01G 31/02 |
| | | | | | 47/62 E |
| 5,887,383 | A | * | 3/1999 | Soeda | A01G 31/02 |
| | | | | | 47/59 R |
| 7,823,328 | B2 | * | 11/2010 | Walhovd | A01G 31/02 |
| | | | | | 47/62 A |
| 8,003,379 | B2 | * | 8/2011 | Goldman | C12M 21/02 |
| | | | | | 385/147 |
| 8,418,403 | B1 | * | 4/2013 | Nuttman | A01G 9/024 |
| | | | | | 47/82 |
| 8,505,238 | B2 | * | 8/2013 | Luebbers | A01G 31/02 |
| | | | | | 47/62 A |
| 2010/0162621 | A1 | * | 7/2010 | Seebo | C12M 21/02 |
| | | | | | 47/1.4 |
| 2013/0014435 | A1 | * | 1/2013 | Hansen | A01G 31/02 |
| | | | | | 47/60 |
| 2014/0069007 | A1 | * | 3/2014 | Chen | A01G 7/045 |
| | | | | | 47/66.6 |

FOREIGN PATENT DOCUMENTS

| EP | 0803188 A2 | 10/1997 |
| JP | 06233635 A | 8/1994 |
| KR | 20090119649 A | 11/2009 |

* cited by examiner

VEGETABLE CARRYING BOX

CROSS-REFERENCE TO RELATED APPLICATIONS

This application claims priority to Chinese Patent Application Nos. 201310209842.3, 201310209841.9, 201310209594.2, and 201310209291.0, all filed May 30, 2013 in the State Intellectual Property Office of P.R. China, which are incorporated herein by reference in their entireties.

FIELD OF THE INVENTION

The present invention relates to the field of vegetable preservation or growing technologies, and in particular, to a vegetable carrying box.

BACKGROUND OF THE INVENTION

A soilless culture technology is an important vegetable production technology. At present, in the field of soilless culture, multiple cultivation troughs are usually placed on a supporting rack in layers, and the multiple-layer cultivation troughs are interconnected by using pipeline, so that nutrient solution flows successively from a cultivation trough at the top to a cultivation trough at the lowest layer. An existing cultivation trough is a simple rectangular trough. When the nutrient solution flows inside the cultivation trough, there are flow blind angles for the nutrient solution near the edges and corners of the cultivation trough, causing non-uniform distribution of nutrient ingredients, and affecting growth of vegetables. In addition, cultivation in layers causes a problem of shading, that is, an upper layer cultivation trough shades a lower layer cultivation trough, leading to lack of light for the lower layer cultivation trough. Pipeline connecting portions between layers of cultivation troughs and between the cultivation trough and a pump are connected by using pipe joints. When this connection manner is used, disassembly and assembly are cumbersome, and a problem of leaking is easy to occur after multiple times of disassembly and assembly.

In addition, a refrigerator is usually used to preserve vegetables at present. This preservation manner is used to preserve picked vegetables, and there is a problem that a preservation time is short.

SUMMARY OF THE INVENTION

A brief summary of the present invention is given below to provide basic explanations of some aspects of the present invention. It should be understood that this summary is not an exhaustive summary of the present invention. This summary is not intended to determine key or important parts of the present invention, and is not intended to limit the scope of the present invention either. The objective of this summary is merely to provide some concepts in a simplified manner, as a preface of more detailed descriptions provided later.

The present invention provides a vegetable carrying box, to resolve problems that an existing cultivation trough has flow blind angles for nutrient solution, which causes non-uniform distribution of nutrient ingredients and affects growth of vegetables, and a refrigerator is used to preserve vegetables, which has a short preservation time.

The present invention provides a vegetable carrying box, which includes a solution carrying box provided with a high-level liquid inlet and a low-level liquid outlet that are opposite to each other, where an area, which is between the liquid inlet and the liquid outlet, in the solution carrying box is provided with protruding diversion partitions to form a zigzag flow passage, and atomizer is disposed in the flow passage.

In the vegetable carrying box provided in the present invention, a zigzag flow passage is formed between an area between a liquid inlet and a liquid outlet, so that nutrient solution forms a nutrient solution flow inside the entire vegetable carrying box, which flows through the entire vegetable carrying box; therefore, nutrient solution ingredients inside the vegetable carrying box are relatively uniform, which is beneficial to balanced growth of vegetables. In addition, atomizer atomizes the nutrient solution, so that the nutrient solution uniformly volatilizes to an upper space of the vegetable carrying box in a form of mist, to facilitate absorption by vegetable, and meeting a nutrition requirement for vegetable growth. Besides, the atomizer may be used to control an atomization amount of the nutrient solution, so as to control a growth speed of the vegetables, so that the vegetables are correspondingly in a regular growth state, a slow growth state, or a zero growth state, to extend a preservation time of the vegetables.

DETAILED DESCRIPTION OF THE INVENTION

Embodiments of the present invention are described below with reference to the accompanying drawings. Elements or features described in one figure or one implementation manner of the present invention may be combined with elements and features shown in one or more other figures or implementation manners. It should be noted that, for the purpose of clarity, representations and descriptions of parts and processing that are irrelevant to the present invention and known to one of ordinary skill in the art are omitted in the accompanying drawings and illustration.

Figure 1:
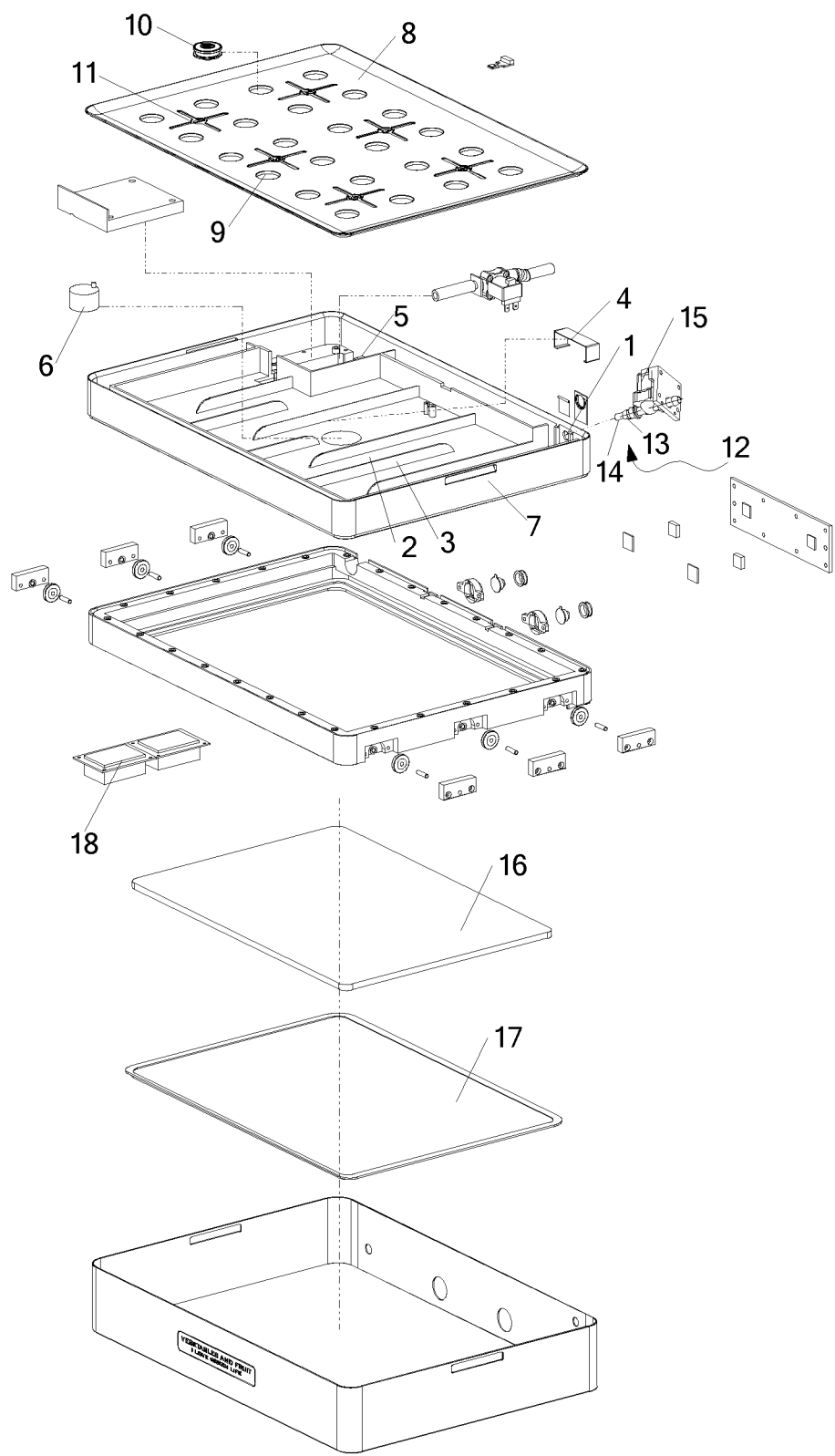
FIG. 1 is an exploded diagram of a vegetable carrying box according to an embodiment of the present invention.
Figure 2:
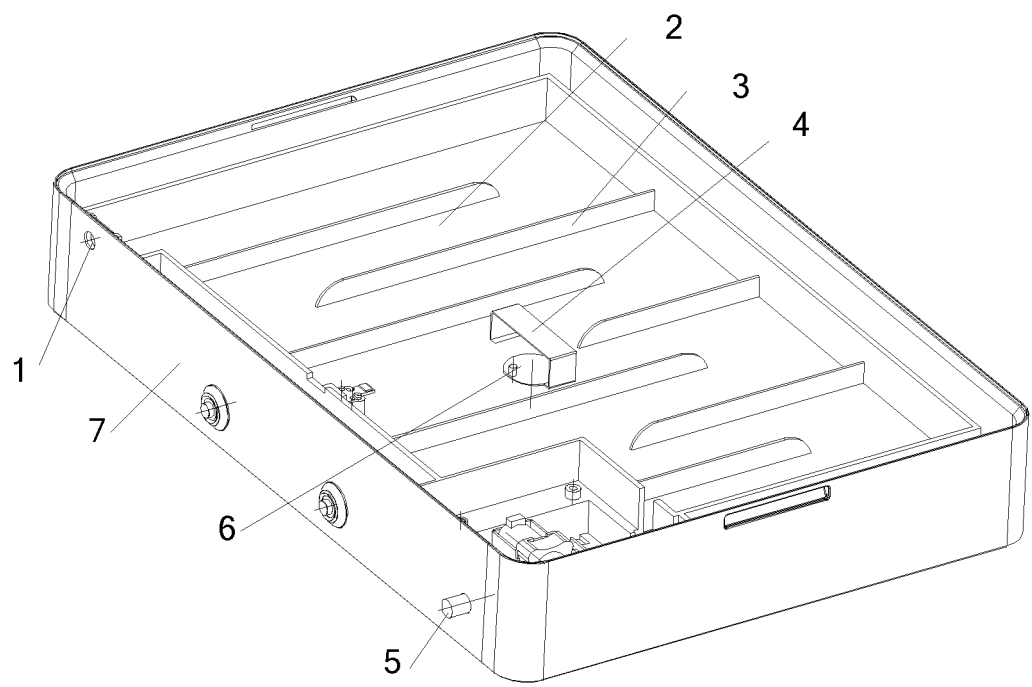
FIG. 2 is a schematic structural diagram of a solution carrying box in FIG. 1.
Figure 3:
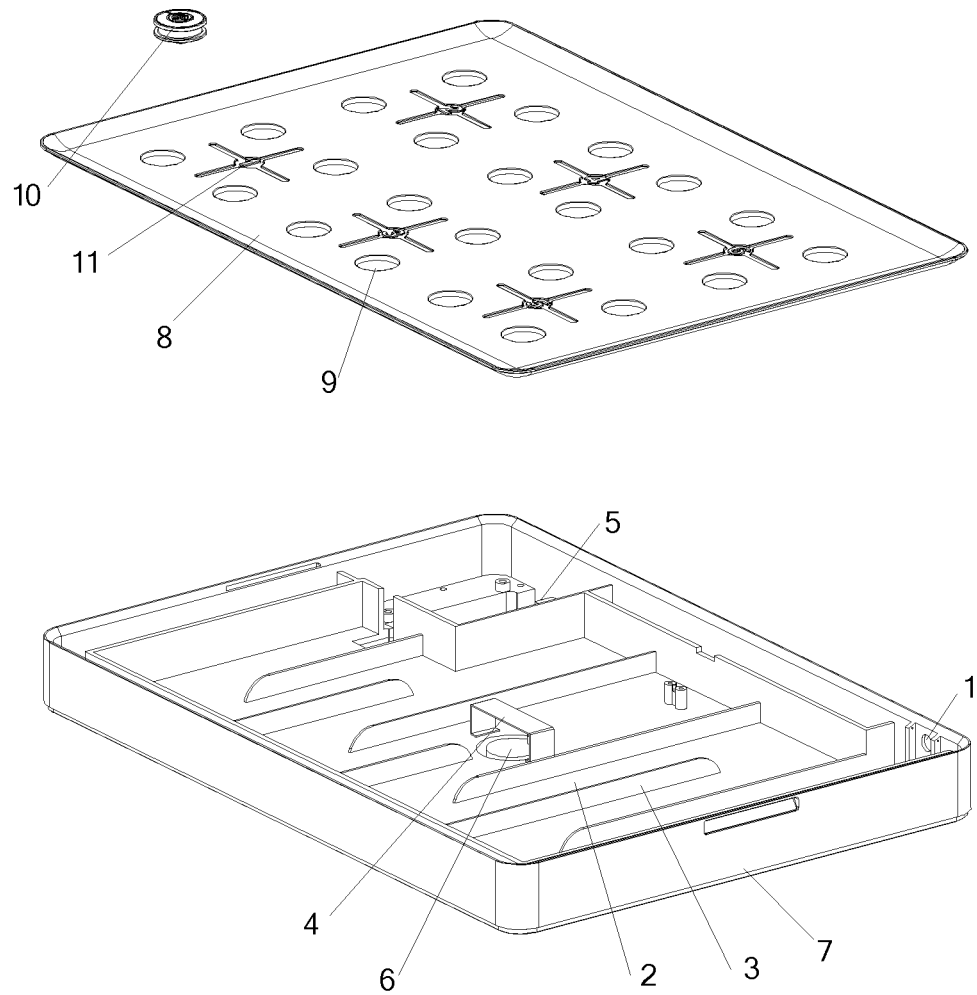
FIG. 3 is a schematic diagram of the solution carrying box and a vegetable shelf in FIG. 1.
Figure 4:
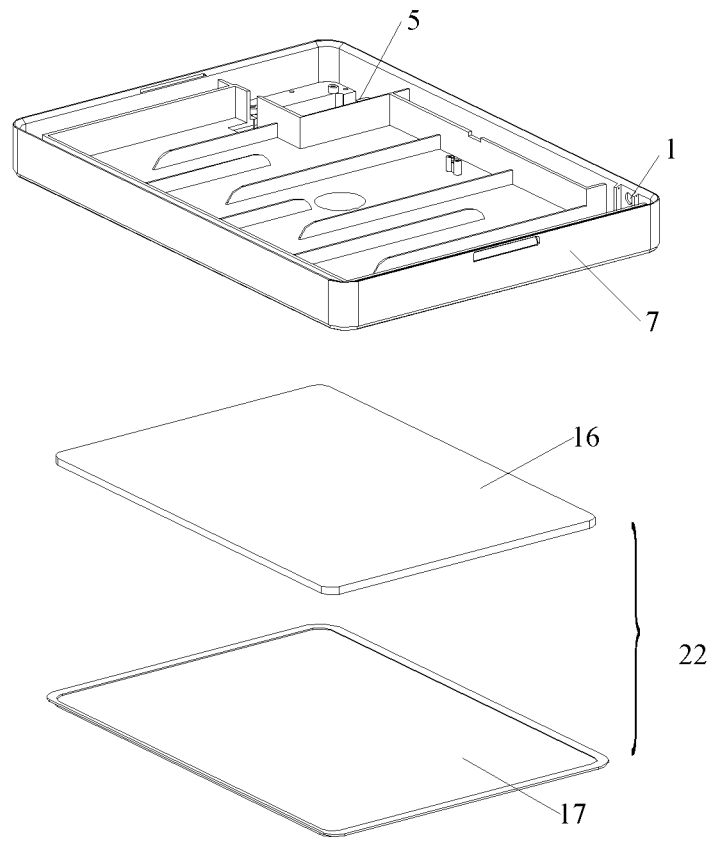
FIG. 4 is a schematic diagram of the solution carrying box and an illumination component in FIG. 1.
Figure 5:
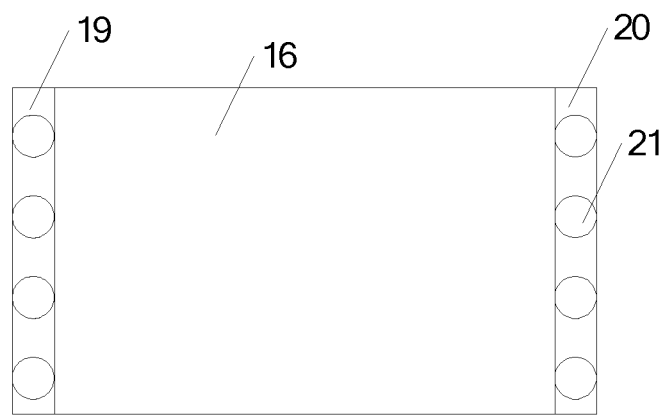
FIG. 5 is a schematic structural diagram of an embodiment of a light source and a light guide plate in FIG. 1.
Figure 6:
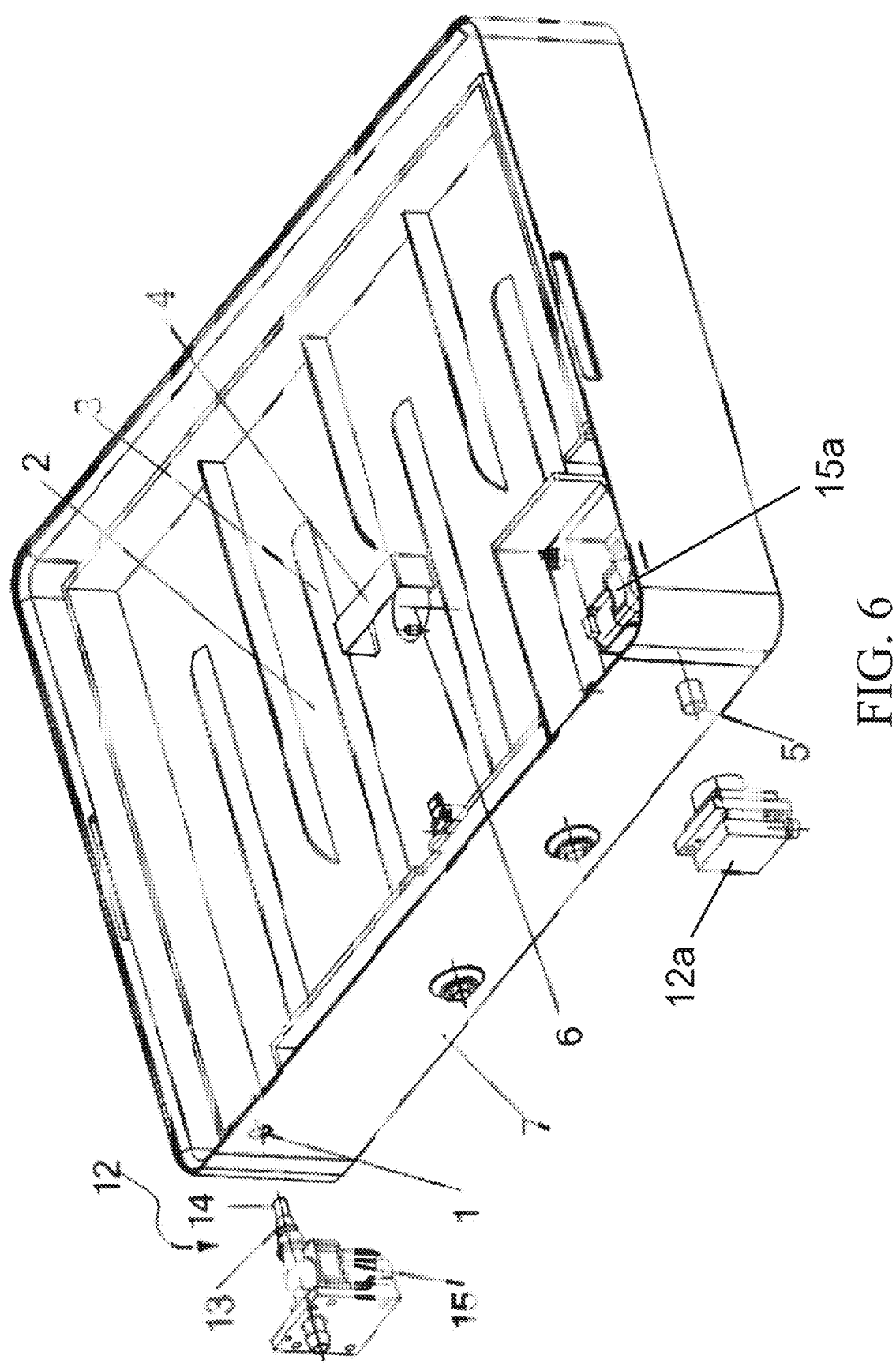
FIG. 6 is a schematic diagram of a part of the vegetable carrying box in FIG. 1 from another viewing angle.

As shown in FIG. 1 to FIG. 6, a vegetable carrying box provided in an embodiment of the present invention includes a solution carrying box 7 provided with a high-level liquid inlet 1 and a low-level liquid outlet 5 that are opposite to each other, a vegetable shelf 8 disposed above the solution carrying box 7, and an illumination component 22 disposed below the solution carrying box 7, where an area, which is between the liquid inlet 1 and the liquid outlet 5, in the solution carrying box 7 is provided with protruding diversion partitions 3 to form a zigzag flow passage 2, and an atomizer 6 is disposed in the flow passage 2. The vegetable shelf 8 is disposed overhead relative to the top of the flow passage 2 to form an overhead space. When in use, on one hand, the vegetable shelf 8 is used to carry vegetables, roots of the vegetables are inside the overhead space, so that the vegetables are disposed overhead and the roots of the vegetables are in the air, which facilitates controlling a growing state of the vegetables to achieve the objective of preservation; on the other hand, the roots of the vegetables hang above the flow passage 2, avoiding unfavorable impacts caused by the roots on flow of a nutrient solution, facilitating respiration of the roots, and improving an ability of absorbing nutrients.

In the vegetable carrying box provided in the foregoing solution, the zigzag flow passage 2 is formed between an area between the liquid inlet 1 and the liquid outlet 5, so that a nutrient solution forms a nutrient solution flow inside the entire vegetable carrying box, which flows through the entire vegetable carrying box, and no blind angle exists; therefore, nutrient solution ingredients inside the vegetable carrying box are relatively uniform, which is beneficial to balanced growing of vegetables. Besides, the nutrient solution flows along the flow passage 2 under the action of gravity, and does not fill up the entire solution carrying box 7, so that there is an overhead space between the flow passage 2 and the vegetable shelf 8; and the atomizer 6 is used to atomize the nutrient solution, and the atomized nutrient solution spreads to the entire overhead space to be absorbed by roots of vegetables, so that the nutrient solution uniformly volatilizes to an upper space of the vegetable carrying box in a form of mist, to facilitate absorption by vegetables, and meeting a nutrition requirement of vegetable growth. Besides, the atomizer 6 may be used to control an atomization amount of the nutrient solution, so as to control a growth speed of the vegetables, so that the vegetables are correspondingly in a regular growth state, a slow growth state, or a zero growth state, to extend a preservation time of the vegetables and to achieve a best preservation effect. Especially, when the vegetables are in the zero growth state, the freshness of the vegetables can be retained for a relatively long time.

In an actual use, the nutrient solution enters into the solution carrying box 7 from the high-level liquid inlet 1 of the solution carrying box 7, flows along the zigzag flow passage 2 under the action of gravity, and fills up the entire flow passage 2, until being discharged from the low-level liquid outlet 5. The nutrient solution flows along the zigzag flow passage 2, so that the nutrient solution flows through every corner of the solution carrying box 7, ensuring the freshness and nutrition uniformity of the nutrient solution throughout the entire solution carrying box 7.

Further, based on the foregoing embodiment, a first water swivel 12 for supplying the nutrient solution is disposed on the liquid inlet 1 and a second water swivel 12a for discharging the nutrient solution is disposed on the liquid outlet 5, and at least one of the first and second water swivels 12 and 12a includes a steel-core joint and a flexible material layer that is wrapped around the steel-core joint. The first water swivel 12 and the second water swivel 12s are connected respectively to the liquid inlet 1 and the liquid outlet 5 in a manner of plugging, to facilitate operations of disassembly. In addition, the flexible material layer that is wrapped around the steel-core joint can perform self-correction during plugging due to an elastic action of the flexible material layer, so as to ensure a sealing effect after the plugging.

Further, based on the foregoing embodiment, the steel-core joint includes a circular truncated cone section 13 and a circular tube section 14 that is connected to a small diameter end of the circular truncated cone section 13, and a conical surface of the circular truncated cone section 13 faces to the inside of the vegetable carrying box. The circular tube section 14 has a guide function, to facilitate plugging installation. The circular truncated cone section 13 is used to achieve sealing. Because a diameter of a peripheral surface of the circular truncated cone section 13 increases gradually, it can adapt to the liquid inlet 1 and/or the liquid outlet 5 of multiple bore diameters. Even if the liquid inlet 1 and/or the liquid outlet 5 is enlarged due to abrasion after multiple times of plugging installation, because the circular truncated cone section 13 has an ability of adapting to multiple bore diameters, good sealing performance can still be ensured.

Further, based on the foregoing embodiment, a first solenoid valve 15 is connected to the steel-core joint of the first water swivel 12. The first solenoid valve 15 may use a normally closed solenoid valve. Using the normally closed solenoid valve can avoid a problem that, after the first water swivel 12 is plugged out from the liquid inlet 1, the nutrient solution in the pipeline leaks. A second solenoid valve 15a is disposed in the solution carrying case 7, connected to the liquid outlet 5, and configured such that, when the solution carrying case 7 is pulled out from a vegetable growing case, the second solenoid valve 15a is closed so as to prevent the nutrient solution in the solution carrying case 7 from flowing out.

Further, based on the foregoing embodiment, the vegetable shelf 8 is a plate-shaped component, and multiple through holes 9 are laid out on the vegetable shelf 8. Vegetables are inserted in the through holes 9, roots of the vegetables are in an overhead space between the vegetable shelf 8 and the flow passage 2, and the roots of the vegetables cause no unfavorable impacts on flowing of the nutrient solution. The roots of the vegetables are in an overhead space, so that, on one hand, the roots of the vegetables can be in full contact with the air, facilitating respiration of the roots; on the other hand, the roots can absorb the atomized nutrient solution from the overhead space for growing.

Further, based on the foregoing embodiment, a hole plug 10, which is pluggable, is disposed inside the through hole 9. The hole plug 10 is disposed in the through hole 9 that has no vegetables inserted. The hole plug 10 is disposed in the through hole 9 that has no vegetables inserted, so that, in one hand, the atomized nutrient solution can be prevented from spreading from the through hole 9 to cause a waste, on the other hand, dirt can be prevented from dropping into the solution carrying box 7 from the through hole 9 to contaminate the nutrient solution.

Further, based on the foregoing embodiment, the vegetable shelf 8 has multiple through hole arranging areas, each through hole arranging area has a cross-shaped rib 11, the cross-shaped rib 11 delimits the through hole arranging area into four quadrant areas, and each quadrant in the four quadrant areas is provided with one through hole 9. By using this structure, rigidity of the vegetable shelf 8 is enhanced to enable the vegetable shelf 8 to support the weight of the vegetables, so that the vegetables are above the nutrient solution in an overhead manner, and the roots of the vegetables are in the air to absorb the atomized nutrient solution, to facilitate controlling a growth state of the vegetables by better controlling an atomization amount of the nutrient solution, so that the vegetables are correspondingly in a regular growth state, a slow growth state, or a zero growth state, to achieve the objective of preserving the vegetables.

The atomizer 6 may be, but is not limited to, an ultrasonic atomizer.

Further, based on the foregoing embodiment, to protect the atomizer 6 and to prevent the roots, which grow downward, of the vegetables from harming the atomizer 6, an atomizer cover plate 4 is disposed above the atomizer 6 in a covering manner, and the atomizer cover plate 4 has a function of covering the atomizer 6. The atomizer cover plate 4 may also change a direction of atomized vapor to spread all around, helping the atomized vapor to spread inside the entire solution carrying box 7, so that vegetables cultivated everywhere in the vegetable carrying box can absorb nutrients more fully.

Further, based on the foregoing embodiment, the atomizer cover plate 4 includes a top plate, two sides of the top plate are connected to a supporting plate that bends downward, and a lower end of the supporting plate is fixedly connected to the solution carrying box 7. The atomizer cover plate 4 may use this structure to have a simple connection and reliable performance.

Further, based on the foregoing embodiment, multiple diversion partitions 3 are arranged side by side in the solution carrying box 7, and every two adjacent diversion partitions 3 are disposed separately at two sides of the solution carrying box 7. By using this structure, the flow passage 2 has a longer flow path inside the solution carrying box 7, and the solution can flow through the entire space of the solution carrying box 7; besides, a time of flowing inside the flow passage 2 by the nutrient solution is longer, so that vegetables cultivated everywhere in the vegetable carrying box can absorb nutrients fully for growing.

Further, based on the foregoing embodiment, to reduce flow resistance of the nutrient solution during a flowing process and to ensure stability of the flowing of the nutrient solution, the multiple diversion partitions 3 are parallel to each other.

Further, based on the foregoing embodiment, to ensure that an entire twisting flow passage 2 is formed inside the solution carrying box 7, and to prevent the nutrient solution from directly flowing from one side of the solution carrying box 7 to another side of the solution carrying box 7, every two adjacent diversion partitions 3 have an overlapping portion in a projection direction perpendicular to the diversion partition 3, and the flowing nutrient solution changes direction of flowing in the overlapping portion.

Further, based on the foregoing embodiment, the diversion partition 3 is a strip plate vertically disposed. The strip plate can guide the fluid, and also save space inside the solution carrying box 7.

Further, based on the foregoing embodiment, both axes of the liquid inlet 1 and the liquid outlet 5 are horizontally disposed and are parallel to each other, so that the vegetable carrying box can be disassembled and assembled along a horizontal direction, facilitating plugging the liquid inlet 1 and the liquid outlet 5 with an external pipeline system.

Further, based on the foregoing embodiment, the liquid inlet 1 and the liquid outlet 5 are located at a same side of the solution carrying box 7, so that when the vegetable carrying box is disassembled and assembled along a horizontal direction, plugging of the liquid inlet 1 and the liquid outlet 5 can be completed simultaneously.

Further, based on the foregoing embodiment, to ensure that the atomized nutrient solution can spread inside the entire solution carrying box 7 uniformly, the atomizer 6 is disposed at a middle part of the solution carrying box 7.

An illumination component 22 is disposed at the bottom of the vegetable carrying box provided in this embodiment of the present invention. For a stack-up use, the illumination component 22 at the bottom of an upper layer vegetable carrying box provides sufficient light to a lower layer vegetable carrying box, so that vegetables in the lower layer vegetable carrying box can obtain sufficient light for growing or preservation.

Further, based on the foregoing embodiment, the illumination component 22 includes a light source and a light guide plate 16, the light source and the light guide plate 16 are disposed cooperatively, and the light guide plate 16 is configured to make light emitted by the light source distributed uniformly.

Further, based on the foregoing embodiment, as shown in FIG. 2, as an optional implementation manner, the light source includes a first linear light source 19 and a second linear light source 20, which are separately symmetrically disposed on two sides of the light guide plate 16. The first linear light source 19 and the second linear light source 20 both include multiple unit light sources 21 that are arranged linearly. When the first linear light source 19 or the second linear light source 20 emits light, light is guided by the light guide plate 16, so that the whole light guide plate 16 emits light uniformly, that is, the linear light source is converted into a planar light source. In this way, light utilization can be improved by a maximum degree, and energy consumption can be reduced, thereby effectively saving energy.

Further, based on the foregoing embodiment, all of the multiple unit light sources 21 are white light sources, so that light in the using space is close to natural light, which can satisfy an illumination requirement of vegetable growing or preservation. It is found through research that growing or preservation of some kinds of vegetables mainly require spectrums corresponding to red light and blue light, therefore, as an optional implementation manner, the multiple unit light sources 21 include red light source and blue light source, which can facilitate vegetable growing or preservation. The multiple unit light sources 21 also include a red light source, a blue light source, and a white light source, so that spectrums can be selected flexibly according to requirements of vegetable growing, to facilitate better vegetable growing or preservation, and to extend vegetable preservation time. In an actual use, the multiple unit light sources 21 are disposed at the bottom of the vegetable carrying box in a detachable manner, and when a problem occurs in a particular unit light source 21, the unit light source 21 is easy to replace; the user may further set a color of the unit light source 21 according to a requirement.

Further, based on the foregoing embodiment, to protect the unit light source 21 and to avoid water condensation on a surface of the unit light source 21, a lamp shade 17 is disposed at a periphery of the light source and the light guide plate 16, where the lamp shade 17 is configured to protect the light source, and is preferably made of a material having high transmittance. Different growth stages of vegetables have different requirements on illumination. Therefore, as an optional implementation manner, the vegetable carrying box provided by this embodiment further includes a controller 18 for controlling light source luminance. The controller 18 is electrically connected to the light source, and is configured to adjust luminance of the light source according to an acquired illumination control signal.

It should be noted that the foregoing embodiments are merely intended for describing the technical solutions of the present invention, but not for limiting the present invention. Although the present invention is described in detail with reference to the foregoing embodiments, one of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A vegetable carrying box, comprising a solution carrying box comprising:
    a bottom and four side walls vertically extending from a periphery of the bottom;
    a high-level liquid inlet formed on one side wall of the four side walls and located distally to the bottom and a low-level liquid outlet formed on said one side wall of the four side walls and located proximately to the bottom, wherein both axes of the liquid inlet and the liquid outlet are parallel to each other and parallel to the bottom;
    protruding diversion partitions space-apart formed on the bottom, wherein an area, which is between the liquid inlet and the liquid outlet, in the solution carrying box is provided with the protruding diversion partitions to form a zigzag flow passage;
    an atomizer disposed on the bottom in the flow passage, wherein the atomizer is an ultrasonic atomizer;
    a first water swivel is pluggingly connected to the liquid inlet for supplying a nutrient solution to the solution carrying box, and a second water swivel is pluggingly connected to the liquid output, wherein the first water swivel comprises a steel-core joint and a flexible material layer that is wrapped around the steel-core joint, the steel-core joint comprises a circular truncated cone section and a circular tube section that is connected to a small diameter end of the circular truncated cone section, and a conical surface of the circular truncated cone section faces to the inside of the solution carrying box; and
    a first solenoid valve connected to the steel-core joint of the first water swivel, and a second solenoid valve disposed in the solution carrying case and connected to the liquid outlet, wherein the first solenoid valve is configured to prevent the nutrient solution from leaking when the first water swivel is plugged out from the liquid inlet, and the second solenoid valve is configured to prevent the nutrient solution in the solution carrying case from flowing out when the solution carrying case is pulled out from a vegetable growing case.

2. The vegetable carrying box according to claim 1, wherein an atomizer cover plate is disposed above the atomizer.

3. The vegetable carrying box according to claim 2, wherein the atomizer cover plate comprises a top plate, wherein two sides of the top plate are connected to a supporting plate that bends downward, and a lower end of the supporting plate is fixedly connected to the bottom of the solution carrying box.

4. The vegetable carrying box according to claim 1, wherein the protruding diversion partitions are arranged side by side in the solution carrying box, and every two adjacent protruding diversion partitions are disposed separately at two sides of the solution carrying box.

5. The vegetable carrying box according to claim 4, wherein the protruding diversion partitions are parallel to each other.

6. The vegetable carrying box according to claim 5, wherein every two adjacent diversion partitions have an overlapping portion in a projection direction perpendicular to the diversion partitions.

7. The vegetable carrying box according to claim 1, wherein the protruding diversion partitions are strip plates vertically disposed on the bottom.

8. The vegetable carrying box according to claim 1, wherein the atomizer is located at a middle part of the solution carrying box.

9. The vegetable carrying box according to claim 1, wherein the vegetable carrying box further comprises a vegetable shelf disposed above the solution carrying box, and the vegetable shelf is disposed overhead relative to the top of the flow passage.

10. The vegetable carrying box according to claim 9, further comprising through holes being formed on the vegetable shelf.

11. The vegetable carrying box according to claim 10, wherein at least one pluggable hole plug is correspondingly disposed inside at least one of the through holes.

12. The vegetable carrying box according to claim 10, wherein the vegetable shelf has multiple through hole arranging areas, each of the through hole arranging areas has a cross-shaped rib, the cross-shaped rib delimits the through hole arranging area into four quadrant areas, and each quadrant in the four quadrant areas is provided with one through hole.

13. The vegetable carrying box according to claim 1, wherein the vegetable carrying box further comprises an illumination component disposed below the solution carrying box.

14. The vegetable carrying box according to claim 13, wherein the illumination component comprises a light source and a light guide plate disposed on a light emergent path of the light source.

15. The vegetable carrying box according to claim 14, wherein the light source comprises: multiple groups of linear light sources symmetrically disposed on two sides of the light guide plate.

* * * * *